United States Patent
Park et al.

(10) Patent No.: US 8,311,401 B2
(45) Date of Patent: Nov. 13, 2012

(54) MULTIMEDIA PLAYING SYSTEM AND METHOD FOR PLAYING MULTIMEDIA USING THE SAME

(75) Inventors: Sang Wook Park, Daejeon (KR); Noh Sam Park, Daejeon (KR); Jong Hyun Jang, Daejeon (KR); Eui Hyun Paik, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 582 days.

(21) Appl. No.: 12/490,541

(22) Filed: Jun. 24, 2009

(65) Prior Publication Data

US 2010/0124404 A1 May 20, 2010

(30) Foreign Application Priority Data

Nov. 14, 2008 (KR) ........................ 10-2008-0113473

(51) Int. Cl.
*H04N 5/77* (2006.01)
(52) U.S. Cl. ....................................... 386/360
(58) Field of Classification Search .......... None
See application file for complete search history.

(56) References Cited

U.S. PATENT DOCUMENTS

| | | | | | |
|---|---|---|---|---|---|
| 5,087,980 | A | * | 2/1992 | Staffer | 386/205 |
| 5,136,390 | A | * | 8/1992 | Inova et al. | 348/383 |
| 5,239,420 | A | * | 8/1993 | Choi | 386/219 |
| 6,075,560 | A | * | 6/2000 | Katz | 348/150 |
| 2001/0009601 | A1 | * | 7/2001 | Kasuya | 386/46 |
| 2008/0012985 | A1 | | 1/2008 | Yu et al. | |

FOREIGN PATENT DOCUMENTS

| | | |
|---|---|---|
| JP | 2001-203984 A | 7/2001 |
| KR | 1019990059970 A | 7/1999 |
| KR | 1020050121345 A | 12/2005 |
| KR | 1020070025632 A | 3/2007 |
| KR | 1020080006444 A | 1/2008 |
| KR | 10-0827119 B1 | 4/2008 |

* cited by examiner

*Primary Examiner* — Huy T Nguyen
(74) *Attorney, Agent, or Firm* — Ladas & Parry LLP (57) ABSTRACT

Provided are a multimedia playing system and a method for playing multimedia using the system. The system includes a first multimedia player, a second multimedia player, and a user interface. The first multimedia player includes a first media controller controlling plays of a first video and a first audio in response to multimedia data received from an external device. The second multimedia player includes a second media controller operating independently of the first multimedia player and controlling plays of second video in response to the multimedia data. The user interface transmits synchronization information to the first and second media controller.

17 Claims, 5 Drawing Sheets

MULTIMEDIA PLAYING SYSTEM AND METHOD FOR PLAYING MULTIMEDIA USING THE SAME

CROSS-REFERENCE TO RELATED APPLICATIONS

This application claims priority under 35 U.S.C. §119 to Korean Patent Application No. 10-2008-0113473, filed on Nov. 14, 2008, in the Korean Intellectual Property Office, the disclosure of which is incorporated herein by reference in its entirety.

TECHNICAL FIELD

The following disclosure relates to a multimedia playing system and a method for playing multimedia using the same, and in particular, to a multimedia playing system and a method for playing a multimedia data including an audio and a video using the same.

BACKGROUND

With development of technologies for recognizing and representing information, the use of multimedia including voice, audio, video, and texts, has increasing. The multimedia may be played by a multimedia player. The multimedia player separates video and audio from multimedia data received from the outside, and synchronizes the separated video and audio to play them. A controller is also provided in the multimedia player to control the play speed of the video and audio. For example, functions such as pause, fast play, rewind and stop are performed by the controller.

Studies have been conducted on the multimedia player for displaying three-dimensional (3D) images using a tangible media technology. The tangible media technology is a technology that simultaneously plays one multimedia using a plurality of multimedia players.

In the tangible media technology, at least two multimedia players are required to display the 3D images. In order to display the 3D images, videos are synthesized in each multimedia player, and the synthesized videos are projected on a screen.

Accordingly, in order to display the 3D images, videos to be played in each multimedia player are synchronized.

SUMMARY

In one general aspect, a multimedia playing system includes: a first multimedia player including a first media controller controlling plays of a first video and a first audio in response to multimedia data received from an external device; a second multimedia player including a second media controller operating independently of the first multimedia player and controlling plays of second video in response to the multimedia data; and a user interface transmitting synchronization information to the first and second media controller, wherein the first media controller receives play time of the second video from the second media controller according to the synchronization information and minimizes time difference between play time of the first video and the play time of the second video, and the second media controller receives the play time of the first video from the first media controller according to the synchronization information and minimizes time difference between the play time of the second video and the play time of the first video.

In another general aspect, a multimedia playing system includes: a first multimedia player including a user interface playing a first video and a first audio in response to multimedia data received from the outside and receiving synchronization information from the outside, and a first media controller controlling play times of the first video and the first audio in response to the received synchronization information; and a second multimedia player including a media controller playing a second video in response to the multimedia data, receiving the synchronization information through the user interface, and synchronizing play time of the second video with the play of the first video in response to the synchronization information.

In another general aspect, a method for playing multimedia of first and second multimedia players, the multimedia players operating independently of each other and playing first and second videos in response to a multimedia data, includes: exchanging play times of the first and second multimedia players; determining a synchronization mode between the first and second multimedia players according to the exchanged play time information; calculating a time difference between the play times of the first and second multimedia players using a key frame based on the determined synchronization mode; and regulating a play speed of one of the first and second multimedia players according to the calculated time difference.

Other features and aspects will be apparent from the following detailed description, the drawings, and the claims.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
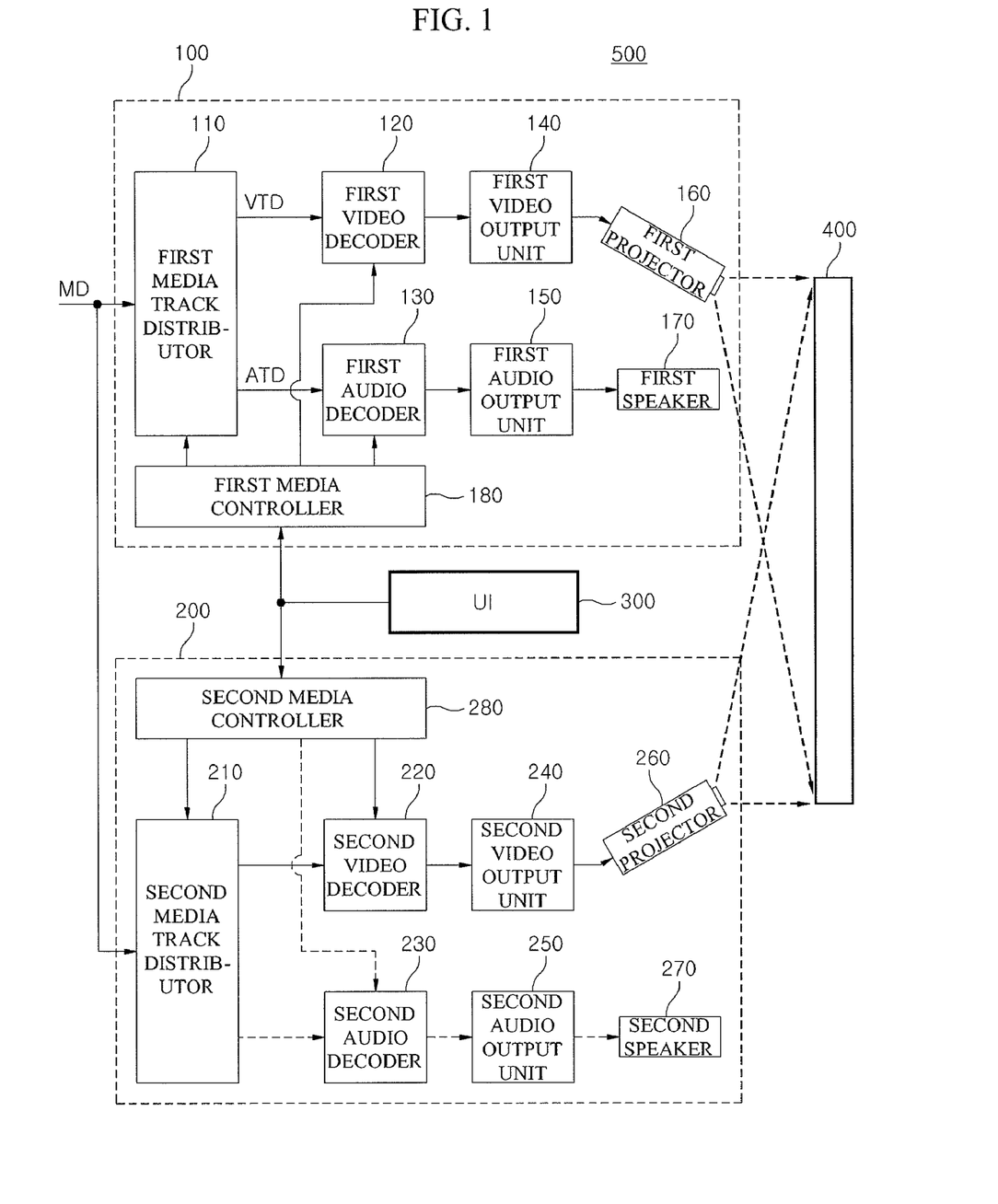
FIG. 1 is a block diagram illustrating an exemplary configuration of a multimedia playing system.

FIG. 1 is a block diagram illustrating an exemplary configuration of a multimedia playing system.

Referring to FIG. 1, a multimedia playing system includes two multimedia players 100 and 200 that play a multimedia data independently of each other.

The two multimedia players 100 and 200 provide a 3D image by simultaneously projecting two video images on one screen 400. An image play time is synchronized between the two multimedia players 100 and 200 that operate independently of each other. That is, the image play time is synchronized between two multimedia players that are independent from or incompatible with each other.

The multimedia playing system 500 includes a first multimedia player 100, a second multimedia player 200 that operates independently from the first multimedia player 100, and a user interface (UI) 300 for transmitting the synchronization information to the first and second multimedia players 100 and 200.

Also, in order to provide a 3D image, the multimedia playing system 500 further includes a screen 400 on which an image light from the first multimedia player 100 and an image light from the second multimedia player 200 are projected to display the 3D image.

The first and second multimedia players 100 and 200 are provided with a multimedia data MD including a video track data VTD and an audio track data ATD through a certain storage media or a wired/wireless network. Examples of the storage media may include a compact disk, a DVD, a RAM, a hard disk, and the like.

The first multimedia player 100 includes a first media track distributor 110, a first video decoder 120, a first audio decoder 130, a first video output unit 140, a first audio output unit 150, a first projector 160, a first speaker 170, and a first media controller 180.

The first media track distributor 110 is supplied with the multimedia data MD from the storage media or the wired/wireless network, and separates the video track data VTD and the audio track data ATD from the multimedia data MD. The separated video track data VTD and audio track data ATD are delivered to the first video decoder 120 and the first audio decoder 130, respectively.

The first video decoder 120 decodes the video track data VTD separated by the first media track distributor 110, and delivers the decoded video track data VTD to the first video output unit 140.

The first video output unit 140 converts the decoded video track data VTD into a video signal VS processable by the projector 160, and transmits the video signal VS to the projector 160.

The first audio decoder 130 decodes the audio track data ATD separated by the first media track distributor 110, and delivers the decoded audio track data ATD to the first audio output unit 150.

The first audio output unit 150 converts the decoded audio track data ATD into an audio signal AS processable by the speaker 170, and transmits the audio signal AS to the speaker 170.

The first speaker 170 outputs an analog type audio in response to the first audio signal AS1 transmitted from the first audio output unit 150. Accordingly, the audio corresponding to the video is outputted by the speaker 170.

The first projector 160 projects a first image corresponding to the first video signal VS1 on the screen 400 in response to the first video signal VS1 transmitted from the first video output unit 140. Thus, the video corresponding to the first image is projected on the screen 400.

The first media controller 180 controls the first media track distributor 110, the first video decoder 120, and the first audio decoder 130. For example, control may include pause, fast play, rewind, stop and move.

The second multimedia player 200 includes a second media track distributor 210, a second video decoder 220, a second audio decoder 230, a second video output unit 240, a second audio output unit 250, a second projector 260, a second speaker 170, and a second media controller 180.

The second multimedia player 200 has similar configuration and functions to the first multimedia player 100. Accordingly, description of the elements of the second multimedia player 200 will be substituted with the above description of the elements of the first multimedia player 100.

The user interface 300 transmits synchronization information to the first and second multimedia players 100 and 200 in order to synchronize the videos played by the first and second multimedia players 100 and 200.

The user interface 300 includes a software type multimedia browser, which assigns a track to be played by each multimedia player. For example, the first multimedia track data and the first audio track data are assigned for the first multimedia player 100 by the multimedia browser. Thus, a video corresponding to the first video track data and an audio corresponding to the first audio track data are outputted by the first multimedia player 100.

The second multimedia track data is assigned for the second multimedia player 200 by the multimedia browser. Thus, a video corresponding to the second video track data is outputted by the second multimedia player 200. As one example, the second audio track data may not be assigned for the second multimedia player 200 by the multimedia browser. Accordingly, the video corresponding to the first video track data and the video corresponding to the second video track data are synthesized into one 3D image. The audio corresponding to the synthesized video is outputted only by the first multimedia player 100.

The first and second multimedia players 100 and 200 may be present in a form of a stand-alone hardware or software. That is, the first and second multimedia players may be present in a different form of hardware. Also, the first multimedia player may be present in a form of software, while the second multimedia player may be present in a form of hardware.

As an example, play times may be asynchronous between the videos of the first and second multimedia players 100 and 200. Various types of information for the synchronization are exchanged between the first media controller 180 of the first multimedia player 100 and the second media controller 280 of the second multimedia player 200.

Based on the exchanged various types of information on the synchronization, the videos are synchronized between the first and second multimedia players 100 and 200. The video synchronization is performed through functions of the first and second media controllers 180 and 280, for example move, fast play, pause, and the like.

Although, in FIG. 1, the user interface is configured to be provided on the exterior of the first and second multimedia players 100 and 200, the user interface may be provided on the interior of the first multimedia player 100 or the second multimedia player 200.

Figure 2:
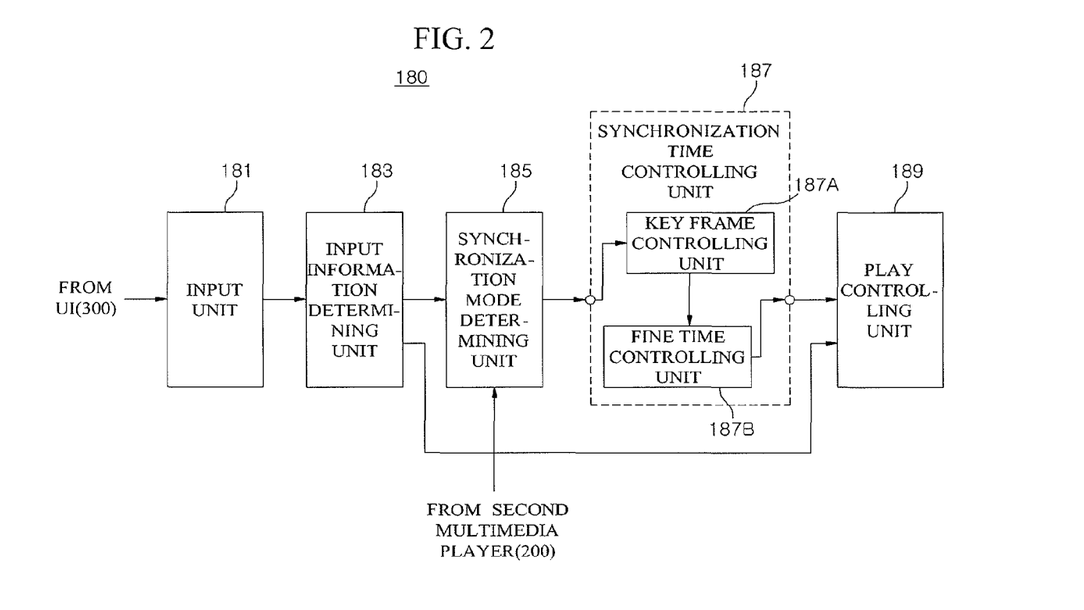
FIG. 2 is a block diagram illustrating an exemplary internal configuration of a first media controller in FIG. 1.

FIG. 2 is a block diagram illustrating an exemplary configuration of a first media controller in FIG. 1. However, in FIG. 1, the internal configuration and functions of the second media controller 280 are similar to those of the first media controller 180. Accordingly, detail description thereof will be substituted with the description of the first media controller 180.

Referring to FIG. 2, the first media controller 180 includes an input unit 181, an input information determining unit 183, a synchronization mode determining unit 185, a synchronization time controlling unit 187, and a play controlling unit 189.

The input unit 181 receives input information including various types of play information (for example, fast play, rewind, move, and the like) related to the video play and synchronization information by a user.

The input information determining unit 183 determines whether the input information is the play information or the synchronization information.

If the input information is the play information, the play information is directly delivered to the play controlling unit 189 without passing through the synchronization mode determining unit 185 and the synchronization controlling unit 187.

The play controlling unit 189 generates control signals relevant to the video and audio play according to the play information directly delivered from the input information determining unit 183. The first media track distributor 110, the first video decoder 120, and the first audio decoder 130 are controlled by the generated control signals, so that the first multimedia player may play the video. Synchronization is not performed between the first and second multimedia players 100 and 200.

If the input information is the synchronization information, the synchronization information is transmitted to the synchronization mode determining unit 185. The synchronization mode determining unit 185 recognizes various types of preset values included in the synchronization information and play time information of the second multimedia player 200 from the second multimedia player 200.

According to the result of the recognition, the synchronization mode determining unit 185 assigns a role of the first multimedia player 100, including the synchronization mode determining unit 185, with respect to the second multimedia player 200.

According to the various types of present values inputted through the user interface 300, the synchronization time controlling unit 187 synchronizes the play time of the first multimedia player 100 with the play time provided from the second multimedia player 200.

The synchronization time control unit 187 includes a key frame controlling unit 187A and a fine time controlling unit 187B.

The key frame controlling unit 187A synchronizes the play time of the first multimedia player 100 with the play time of the second multimedia player 200 by the key frame.

After the play time of the first multimedia player 100 is synchronized with the play time of the second multimedia player 200 by the key frame, the fine time controlling unit 187B regulates a remaining time gap between the play time of the first multimedia player 100 and the play time of the first multimedia player 200 to be less than the critical time gap.

The play controlling unit 189 performs functions, for example play, move, pause, fast play, rewind, and stop, according to the values regulated in the synchronization controlling unit 187.

Figure 3:
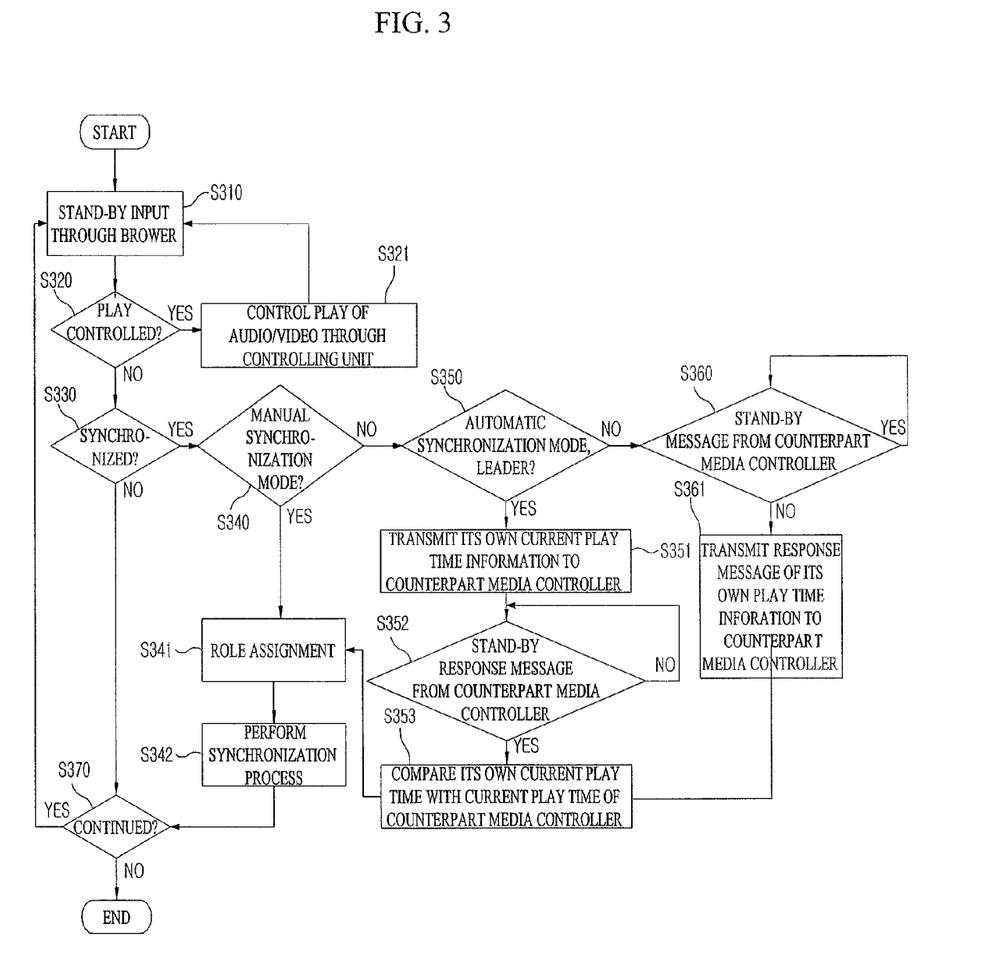
FIG. 3 is a flowchart illustrating an exemplary operation process of the first media controller in FIG. 2.

FIG. 3 is a flowchart illustrating an exemplary operation of the first media controller in FIG. 2.

Referring to FIGS. 2 and 3, in operation S310, an input unit 181 maintains a standby state until input information is inputted through a multimedia browser provided on a user interface 300. If the input information is inputted, the input information is delivered to an input information determining unit.

In operation S320, the input information determining unit 183 determines whether the input information delivered from the input unit 181 is play information (for example, play, pause, fast play, move, and the like) or synchronization information indicating a play time synchronization between first and second multimedia controllers 180 and 280.

If the input information is the play information, in operation S321, a play information unit 189 controls the play of audio/video.

In operation S330, if the input information is the synchronization information, the synchronization mode determining unit 185 receives the synchronization information from the input unit 181 and analyzes the synchronization information.

In operation S340, if play time information of first and second multimedia players 100 and 200 is included in the synchronization information, the first and second multimedia players are synchronized using a manual synchronization manner. That is, in the manual synchronization manner, the first and second multimedia players 100 and 200 are synchronized according to the play time directly inputted by a user through a multimedia browser.

In the manual synchronization manner, the play time of the first media controller 180 and the play time of the second media controller 280, which are provided by the user, are compared. In operation S341, each role of first and second media controllers is assigned according to the comparison result. That is, the first and second media controllers 180 and 280 are assigned as one role of a leader, a latecomer, and a companion, respectively. For example, if the play time of the first media controller 180 is faster than that of the second media controller 280, the first media controller 180 becomes the leader, and second media controller 280 becomes the latecomer. Otherwise, the first media controller 180 becomes the latecomer, and second media controller 280 becomes the leader. If the play time of the first media controller 180 is similar to the play time of the second media controller 280, the first and second media controller 180 and 280 are assigned as a role of the companion.

In operation S342, synchronization process of the play times between the first and second multimedia players 100 and 200 is performed according to the assigned roles.

In operation S340, if the play time information for synchronizing the first and second multimedia players 100 and 200 according to the user's input is not included in the synchronization information provided from the input unit 181, in operation S350, the first and second multimedia players 100 and 200 are synchronized using an automatic synchronization manner. That is, unlike the manual synchronization manner in which the synchronization process is manually performed according to the time values preset by the user, the automatic synchronization manner is a manner in which the synchronization process is automatically performed without time values preset by the user.

In operation S350, one of the first and second media controllers 180 and 280 is set as a leader according to the preset value inputted through the multimedia browser in this automatic synchronization manner.

In operation S350, if the first media controller is set as a leader according to the preset value, in operation S351, the first media controller 180 saves its own current play time and transmits the current play time to the counterpart media controller, i.e., the second media controller 180. Next, in operation S352, the first media controller 180 stands by to receive a response message from the second media controller 280.

If the second media controller 280 receives the message (including the current play time information of the first media controller) from the first media controller 180, the second media controller 280 transmits the response message to the first media controller 180 in response to the message from the first media controller 180. In this case, the response message transmitted to the first media controller 180 includes current play time information of the second media controller 280.

If the first media controller 180 receives the response message from the second media controller 280, the first media controller 180 analyzes the current play time information of the second media controller 280 included in the response message to calculate a play time by the second media controller 280.

In operation S341, the synchronization mode determining unit 188 calculates the transmission delay time, and assigns the roles of the first and second media controllers 180 and 280 with reference to the current play time of the second media controller 280 included in the response message, respectively. In this case, the transmission delay time is calculated by dividing the difference between the previously-saved play time and the current play time by two.

In operation S350, if the first media controller 180 is not a leader according to the preset value, that is, the second media controller 280 is set as a leader according to the preset value, contrary to operation S352, the second media controller 280 saves its own current play time and transmits the current play time to the first media controller 180. In operation S360, the second media controller 280 stands by to receive a response message from the first media controller 180.

Next, similarly to operation S342, if the first media controller 180 receives a message (including the current play time information of the second media controller) from the second media controller 280, in operation S361, the first media controller 180 transmits a response message to the second media controller 180 in response to the message from the second media controller 280.

Figure 4:
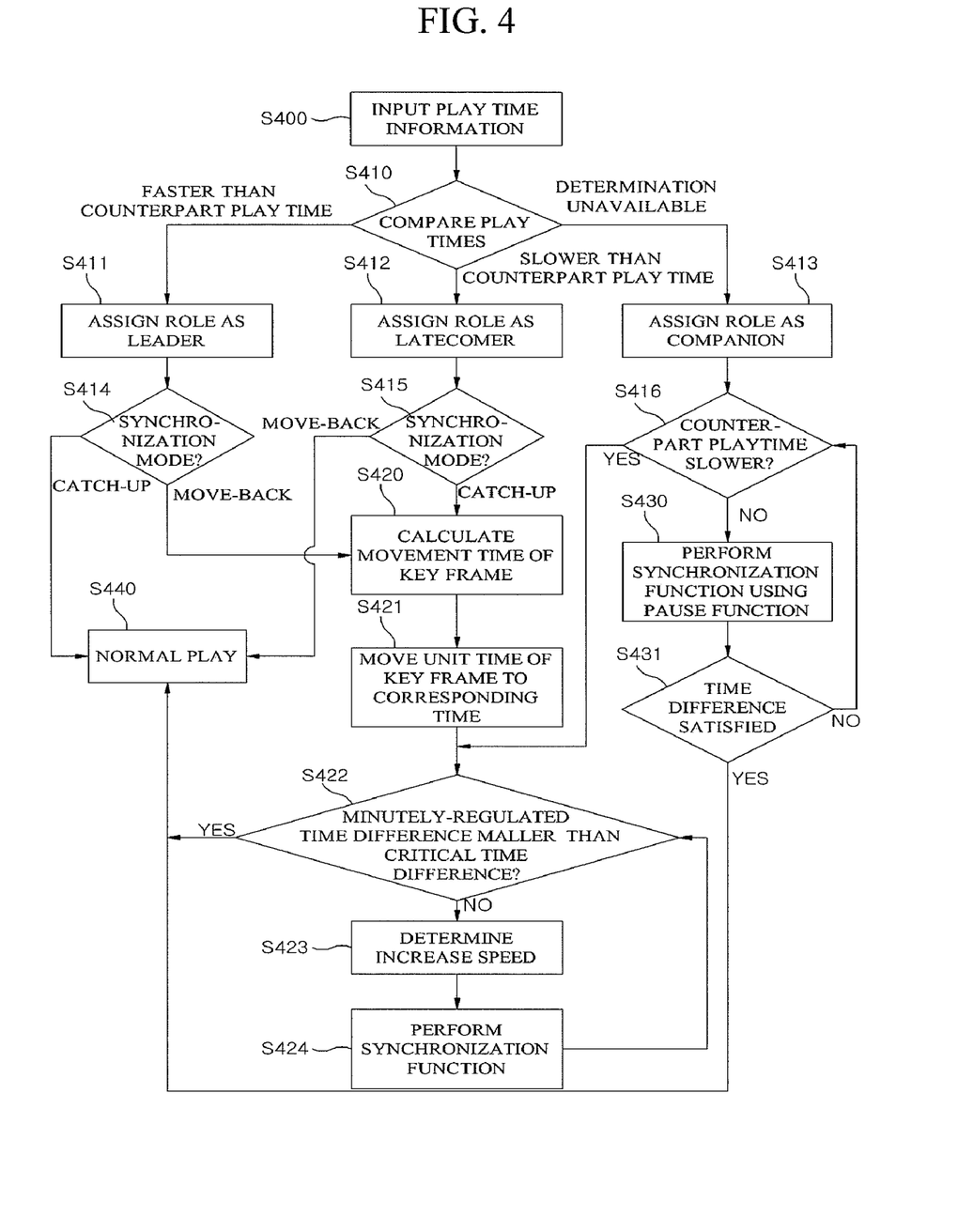
FIG. 4 is a flowchart illustrating an exemplary role assignment and synchronization of FIG. 3.
Figure 5:
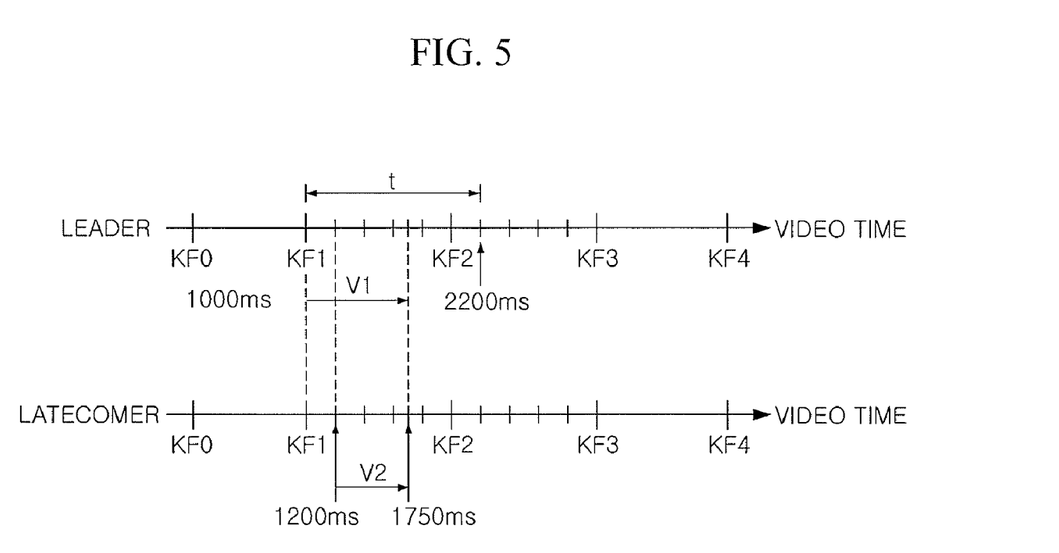
FIG. 5 is a diagram illustrating exemplary synchronization of FIG. 3 according to a preset synchronization mode.

FIG. 4 is a flowchart illustrating operations of assigning a role and performing a synchronization process in FIG. 3. FIG. 5 is a diagram illustrating a synchronization process between play time controlled by a first media controller and play time controlled by a second media controller according to a preset synchronization mode in operation of performing a synchronization process in FIG. 3.

Referring to FIG. 4, in operation S400, first and second multimedia controllers 100 and 200 receive play time information manually preset by a user according to a manual synchronization manner or an automatic synchronization manner or play time mutually exchanged between the first and second multimedia controllers 100 and 200.

In operation S410, play times of the first and second multimedia players 100 and 200 according to one of the manual synchronization manner and the automatic synchronization manner are compared to each other.

In operation S411, if the play time of the first multimedia player 100 is faster than that of the second multimedia player 200, the first multimedia player 100 serves as a leader with respect to the second multimedia player 200.

In operation S412, if the play time of the first multimedia player 100 is slower than that of the second multimedia player 200, the first multimedia player 100 serves as a latecomer with respect to the second multimedia player 200.

In operation S413, if the play time of the first multimedia player 100 is similar to that of the second multimedia player 200, for example, a time difference between both play times falls within a predetermined allowable error range, the first multimedia player 100 and the second multimedia player 200 serve as a companion with respect to each other.

In operation S414, if a role of the first media controller 180 is assigned, one synchronization mode of a catch-up mode and a move-back mode is determined according to an option inputted by a multimedia browser.

Referring to FIG. 5, if the first media controller 180 is assigned as a leader and the synchronization mode is the move-back mode, the first media controller 180 measures a key frame time closest to the current play time of the second media controller 280 among the key frames going ahead of the current play time of the second media controller 280. In operation S420, the first media controller 180 calculates a key frame move time corresponding to a time difference between the current play time and the measured key frame time closest to the current play time of the second media controller 280.

For example, if the interval between key frames is 1,000 ms, the current play time of the first media controller 180 as a leader is 2,200 ms, and if the current play time of the second media controller 280 as a latecomer is about 1,200 ms, the first media controller 180 measures the key frame KF1 time closest to the current play time (about 1,200 ms) of the second media controller 280 among the key frames KF0 and KF1 going ahead of the current play time (about 1,200 ms) of the second media controller 280. Then, the first media controller 180 determines the move time t1 between its own current play time about 2,200 ms and the measured key frame KF1 time.

If the move time t1 is determined by the first media controller 180, in operation S421, the first media controller 180 moves its own current play time (about 2,200 ms) to the corresponding key frame KF1 time using the seek function of a play controlling unit 189 provided in the first media controller 180. This process is performed the key frame controlling unit 187A as described in FIG. 2.

Even though the synchronization process by the key frame unit is performed, when there is a time difference between the play time of the first media controller 180 and the play time of the second controller 280, a synchronization process for reducing the fine time difference less than the key frame unit is performed in the fine time controlling unit 187B as described in FIG. 2.

Hereinafter, the synchronization process performed in the fine time controlling unit 187 will be described.

Even though the synchronization process by the key frame unit is performed, when there is a time difference between the play time of the first media controller 180 and the play time of the second media controller 280, the fine time difference is compared with a predetermined critical time difference in operation S422.

Referring again to FIG. 5, the remaining time difference of about 200 ms between the first and second media controllers 180 and 280 after the movement of the current play time to the key frame time KF1 in the synchronization process by the key frame unit is minimized through "fast play" performed in the fine time controlling unit 187B of the first media controller 180. The first media controller 180 performs a fast play V1 of about 500 ms at 1.5× speed in consideration of system parameters and a delay time for a controlling operation of a play controlling unit 189 provided in the first media controller 180. While the first media controller 180 performs the fast play V1 of about 500 ms at 1.5× speed, the second media controller 280 performs the normal play V2 at normal speed. That is, the play time of the first media controller 180 as a leader becomes about 1,750 ms by adding the fast play V1 of about 750 ms (1.5 times about 500 ms) to the current play time (KF1 about 1,000 ms).

The play time of the second media controller 280 as a latecomer becomes about 550 ms by adding the delay time of about 50 ms for processing a command according to the fast play of the first media controller 180 to the normal play V2 time (about 1,700 ms).

Since about 50 ms is used to process the command in the first media controller 180 as the leader, about 50 ms is added to about 1,700 ms in a video played by the second media controller 280 as the latecomer, so that the video played by the second media controller 280 may be synchronized with a video played at about 1,700 ms by the first media controller 180. Accordingly, the synchronization process for reducing a time difference of about 200 ms between videos played the first and second media controllers 180 and 280 may be performed.

As an example, if the first media controller 180 is assigned as the leader and the synchronization mode is the catch-up mode, the second media controller 280 as the latecomer is regulated to be closest to the play time of the first media controller 180. That is, the first media controller 180 performs the normal play, and the second media controller 280 performs the fast play. Thus, the synchronization process between the first and second media controllers 180 and 280 is performed.

As described above, when all synchronization process is completed, in operation S440, both videos of the first and second multimedia players 100 and 200 are player at a normal speed.

Thus, if the fine time difference is greater than the predetermined critical time difference, in operation S423, the second media controller 280 determines "Increase Speed". In operation S424, the second media controller 280 performs the synchronization process of less than key frame unit and synchronization function of the fine time difference in the order of fast play, standby delay and normal play.

On the other hand, if the first and second media controllers 180 and 280 are assigned as companions in operation S413, video play of a media controller having a relatively fast play time is paused. If video play time of a media controller having a relatively slow play time reaches the play time of the paused media controller, the paused media controller resumes the video play. In this way, the synchronization process between the first and second media controllers 180 and 280 assigned as a companion is performed in operation S430. Thus, the media controller having a slow play time performs a fast play function to perform the synchronization process.

In operation S440, if the play time difference between the first and second media controllers 180 and 280 falls within a predetermined allowable error range, the first and second media controllers 180 and 280 perform a normal play function.

If the play time difference between the first and second media controllers 180 and 280 fails to fall within the predetermined allowable error range, the process in operation S430 is repeatedly performed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multimedia playing system comprising:
   a first multimedia player comprising a first media controller controlling plays of a first video and a first audio in response to multimedia data received from an external device;
   a second multimedia player comprising a second media controller operating independently of the first multimedia player and controlling plays of second video in response to the multimedia data; and
   a user interface transmitting synchronization information to the first and second media controller,
   wherein the first media controller receives play time of the second video from the second media controller according to the synchronization information and minimizes time difference between play time of the first video and the play time of the second video, and the second media controller receives the play time of the first video from the first media controller according to the synchronization information and minimizes time difference between the play time of the second video and the play time of the first video.

2. The multimedia playing system of claim 1, wherein the user interface is comprised in one of the first and second multimedia players.

3. The multimedia playing system of claim 1, wherein the user interface comprises a software-type multimedia browser generating the synchronization information according to an input of a user.

4. The multimedia playing system of claim 3, wherein the synchronization information comprises information on the play time of the first video and information on the play time of the second video.

5. The multimedia playing system of claim 1, wherein the first and second multimedia players comprise:
   a media track distributing unit separating video track data and audio track data from the multimedia data received from the external device;
   a video decoder decoding the separated video track data;
   an audio decoder decoding the separated audio track data;
   a video output unit outputting a video signal corresponding to the decoded video track data; and
   an audio output unit outputting an audio signal corresponding to the decoded audio track data.

6. The multimedia playing system of claim 1, wherein the first and second media controllers comprise:
   a synchronization mode determining unit determining one of a manual synchronization mode and an automatic synchronization mode according to the synchronization information;
   a synchronization time controlling unit controlling the play time of the first and second video according to the determined synchronization mode by a key frame unit; and
   a play controlling unit controlling the play speeds of the first and second videos to be predetermined times speeds according to the play times of the first and second videos regulated by the key frame unit.

7. The multimedia playing system of claim 6, wherein the synchronization controlling unit comprises:
   a key frame controlling unit synchronizing the play time of the first video and the play time of the second video by the key frame unit; and
   a fine time controlling unit controlling a time difference between the play times of the first and second videos to be less than a preset critical time difference by comparing the time difference between the play times of the first and second videos synchronized by the key frame unit with the preset critical time difference.

8. The multimedia playing system of claim 1 further comprising:
   a key frame controlling unit that executes a first synchronization function with respect to the first and second videos; and
   a fine time controlling unit that executes a second synchronization function that is more detailed than the first synchronization function with respect to the first and second videos.

9. A multimedia playing system comprising:
   a first multimedia player comprising a user interface playing a first video and a first audio in response to multimedia data received from the outside and receiving synchronization information from the outside, and a first media controller controlling play times of the first video and the first audio in response to the received synchronization information; and a second multimedia player comprising a media controller playing a second video in response to the multimedia data, receiving the synchronization information through the user interface, and synchronizing play time of the second video with the play of the first video in response to the synchronization information, wherein the first and second multimedia players exchange play time information for synchronizing the play time of the second video with the play time of the first video.

10. The multimedia playing system of claim 9, wherein the second media controller performs data communication with the first media controller through the user interface.

11. The multimedia playing system of claim 9, further comprising a screen on which a first image light corresponding to the first video and a second image light corresponding to the second video are substantially simultaneously projected.

12. The multimedia playing system of claim 11, wherein the first multimedia player further comprises a first projector generating the first image light corresponding to the first video, and the second multimedia player further comprises a second projector generating the second image light corresponding to the second video.

13. A method for playing multimedia of first and second multimedia player, the multimedia players operating independently of each other and playing first and second videos in response to a multimedia data, the method comprising:

exchanging play times of the first and second multimedia players;

determining a synchronization mode between the first and second multimedia players according to the exchanged play time information;

calculating a time difference between the play times of the first and second multimedia players using a key frame based on the determined synchronization mode; and regulating a play speed of one of the first and second multimedia players according to the calculated time difference.

14. The method of claim 13, wherein the determining of a synchronization mode comprises:

comparing the play times of the first and second multimedia players;

assigning roles of the first and second multimedia players according to the comparison result, respectively; and determining one of a catch-up mode and a move-back mode according to the assigned role.

15. The method of claim 14, wherein the assigning of roles comprises:

assigning the first multimedia player as a leader with respect to the second multimedia player if the play time of the first multimedia player is faster than the play time of the second multimedia player;

assigning the first multimedia player as a latecomer with respect to the second multimedia player if the play time of the first multimedia player is slower than the play time of the second multimedia player; and assigning the first multimedia player as a companion with respect to the second multimedia player if the time difference between the play time of the first multimedia player and the play time of the second multimedia player falls within a preset allowable error range.

16. The method of claim 15, wherein the calculating of a time difference comprises:

measuring, by the first multimedia player, a previous key frame time closest to a current play time of the second multimedia player among key frames prior to the current play time of the second multimedia player if the first media controller is assigned as the leader and the synchronization mode is the move-back mode; and calculating a key frame move time from a current play time of the multimedia player to the previous key frame time of the second multimedia player.

17. The method of claim 16, wherein the regulating of a play speed comprises:

moving the play time of the first multimedia player to the previous key frame time through a seek function; and synchronizing the play time of the first multimedia player with the play time of the second multimedia player, by increasing the play speed of the first multimedia player moved to the key framed time.

* * * * *